(12) United States Patent
Ma

(10) Patent No.: US 7,701,699 B2
(45) Date of Patent: Apr. 20, 2010

(54) SUPPORTING STRUCTURE AND DISPLAY DEVICE USING THE SAME

(75) Inventor: Hai-Fang Ma, Suzhou (CN)

(73) Assignee: Qisda Corporation, Taoyuan County (TW)

( * ) Notice: Subject to any disclaimer, the term of this patent is extended or adjusted under 35 U.S.C. 154(b) by 449 days.

(21) Appl. No.: 11/708,494

(22) Filed: Feb. 21, 2007

(65) Prior Publication Data
US 2007/0201196 A1 Aug. 30, 2007

(30) Foreign Application Priority Data
Feb. 27, 2006 (TW) .............................. 95106664 A

(51) Int. Cl.
*G06F 1/16* (2006.01)
*G02F 1/1333* (2006.01)

(52) U.S. Cl. ...................... 361/679.21; 361/679.22; 361/679.26; 349/58; 248/917

(58) Field of Classification Search ..............................
361/679.01–679.45, 679.55–679.59; 349/58–60; 248/917–924
See application file for complete search history.

(56) References Cited

U.S. PATENT DOCUMENTS

| | | | | |
|---|---|---|---|---|
| 4,760,495 A * | 7/1988 | Till | .............................. | 361/804 |
| 5,519,169 A * | 5/1996 | Garrett et al. | ............... | 174/371 |
| 5,671,124 A * | 9/1997 | Ho | .............................. | 361/758 |
| 6,140,591 A * | 10/2000 | Osborne et al. | .......... | 174/138 E |
| 6,151,207 A * | 11/2000 | Kim | ....................... | 361/679.26 |
| 6,252,768 B1 * | 6/2001 | Lin | ........................ | 361/679.34 |
| 6,307,748 B1 * | 10/2001 | Lin et al. | ..................... | 361/704 |
| 6,542,372 B1 * | 4/2003 | Paquin et al. | ............... | 361/758 |
| 6,560,119 B1 * | 5/2003 | Katsuyama et al. | ......... | 361/752 |
| 6,560,124 B1 * | 5/2003 | Irie et al. | ..................... | 361/816 |
| 6,842,343 B2 * | 1/2005 | Lee | ............................. | 361/747 |
| 7,028,389 B2 * | 4/2006 | Chang | ......................... | 29/739 |
| 7,116,556 B2 * | 10/2006 | Lee et al. | ..................... | 361/704 |
| 7,164,583 B2 * | 1/2007 | Lee et al. | ..................... | 361/704 |
| 7,259,958 B2 * | 8/2007 | Bang et al. | ............. | 361/679.27 |
| 7,295,439 B2 * | 11/2007 | Zhong et al. | ................. | 361/710 |
| 7,310,229 B2 * | 12/2007 | Lee et al. | ..................... | 361/697 |
| 2005/0047100 A1 * | 3/2005 | Kim | ............................ | 361/758 |
| 2006/0044745 A1 * | 3/2006 | Kim | ............................ | 361/681 |
| 2006/0202912 A1 * | 9/2006 | Shin | ............................ | 345/37 |

\* cited by examiner

*Primary Examiner*—Jayprakash N Gandhi
*Assistant Examiner*—Nidhi Desai

(57) ABSTRACT

A supporting structure applied in a display device is provided. The display device includes a casing and a display panel. The supporting structure comprises a fastening component and a sustaining component. The fastening component including a hook set is used for supporting the display panel. The sustaining component having a plurality of slot sets is disposed on the casing. The hook set separately presses against the slots for forming different distances between the display panel and the casing.

26 Claims, 5 Drawing Sheets

US 7,701,699 B2

SUPPORTING STRUCTURE AND DISPLAY DEVICE USING THE SAME

This application claims the benefit of Taiwan application Serial No. 095106664, filed Feb. 27, 2006, the subject matter of which is incorporated herein by reference.

BACKGROUND OF THE INVENTION

1. Field of the Invention

The invention relates in general to a supporting structure, and more particularly to a height-adjustable supporting structure applied in a display device.

2. Description of the Related Art

Liquid crystal display (LCD) device, having the features of light weight, slimness, small size, low power consumption, low radiation and low pollution, has gradually replaced conventional cathode ray tube (CRT) display device and become a standard item of equipment to a new generation computer.

Normally, a liquid crystal display device at least includes a casing and a panel. A plurality of supporting structures are disposed on the casing to support the panel. However, different panels manufactured by different manufacturers have different measures of thickness. In order to correspond to the panels with different measures of thickness, different sets of charge cores are developed to match the supporting structures with different measures of height, not only increasing the production cost but also reducing the production efficiency.

SUMMARY OF THE INVENTION

The invention is directed to a height-adjustable supporting structure. The height-adjustable supporting structure, when disposed in a display device, is able to support various display panels with different measures of thickness. Consequently, there is no need to develop different sets of charge cores to correspond to the display panels with different measures of thickness, not only reducing the production cost but also increasing the production efficiency of the display device.

According to a first aspect of the present invention, a supporting structure applied in a display device is provided. The display device includes a casing and a display panel. The supporting structure includes a fastening component and a sustaining component. The fastening component including a hook set is used for supporting the display panel. The sustaining component having a plurality of slot sets is disposed on the casing.

According to a second aspect of the present invention, a display device including a display panel, a casing and a supporting structure is provided. The supporting structure includes a fastening component and a sustaining component. The fastening component having a hook set is for supporting the display panel. The sustaining component having a plurality of slot sets is disposed on the casing.

The invention will become apparent from the following detailed description of the preferred but non-limiting embodiments. The following description is made with reference to the accompanying drawings.

DETAILED DESCRIPTION OF THE INVENTION

First Embodiment

Figure 1:
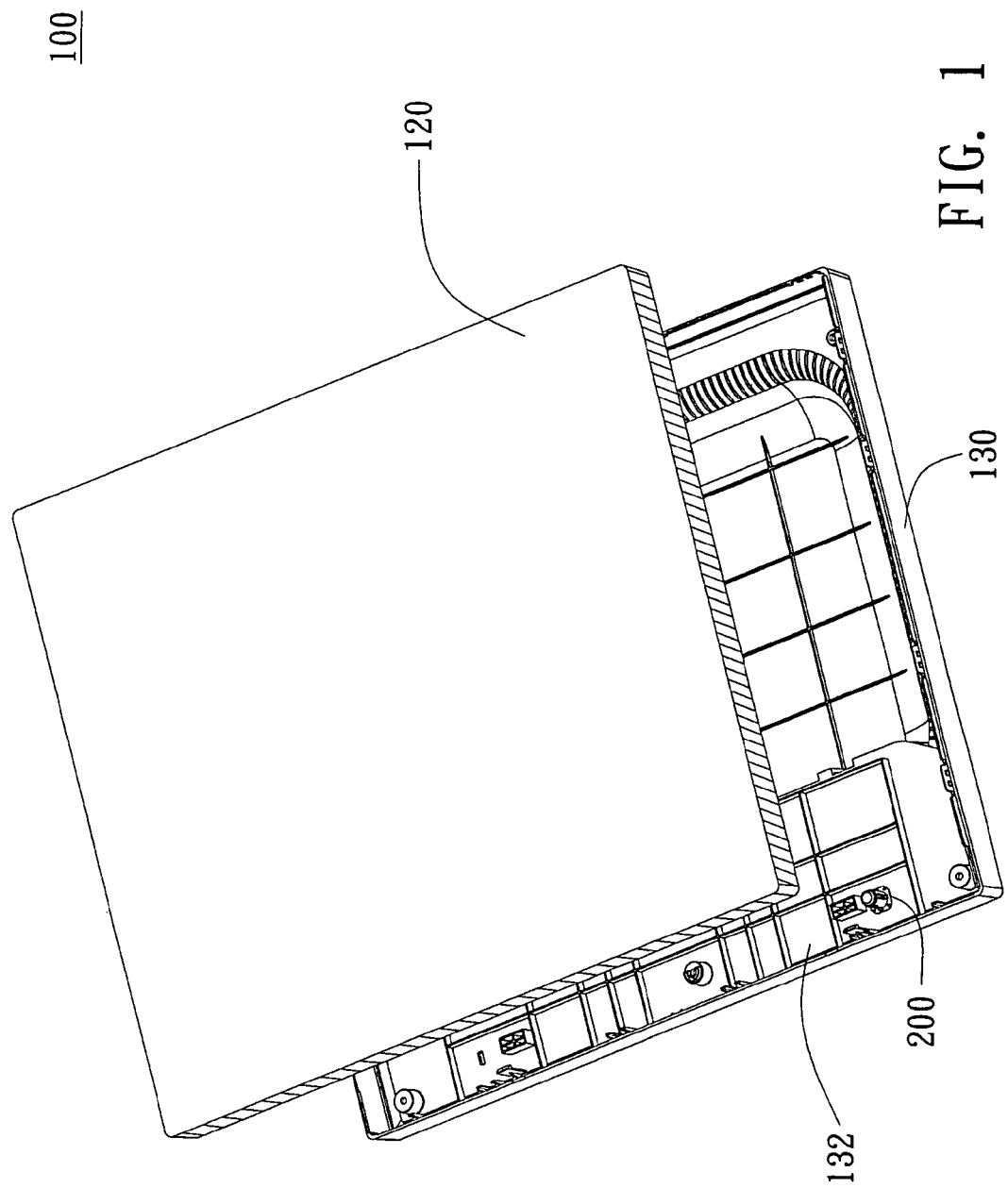
FIG. 1 is a perspective of a display device according to a first embodiment of the invention.
Figure 2A:
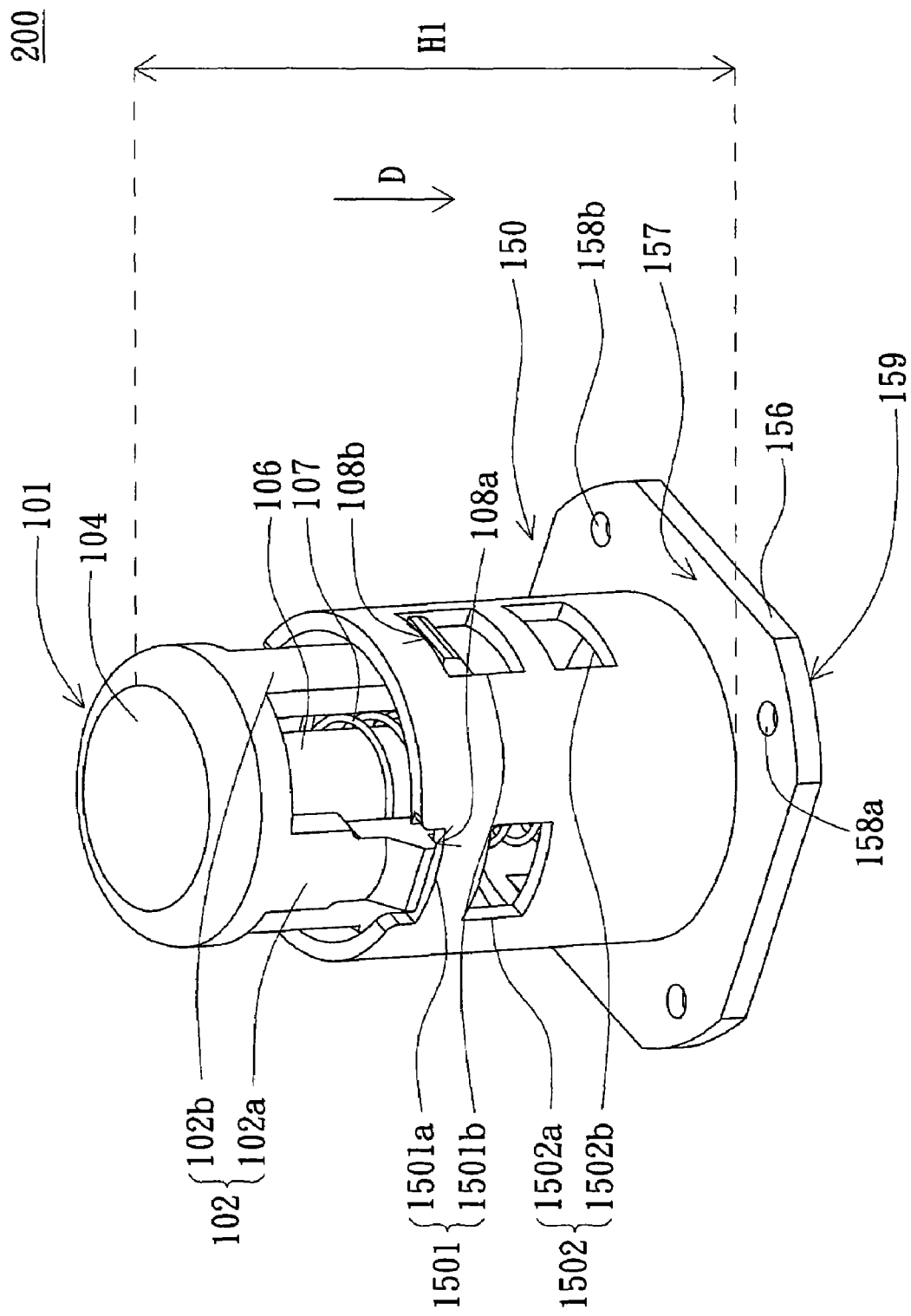
FIG. 2A is a perspective of a supporting structure with a first height according to the first embodiment of the invention.
Figure 2B:
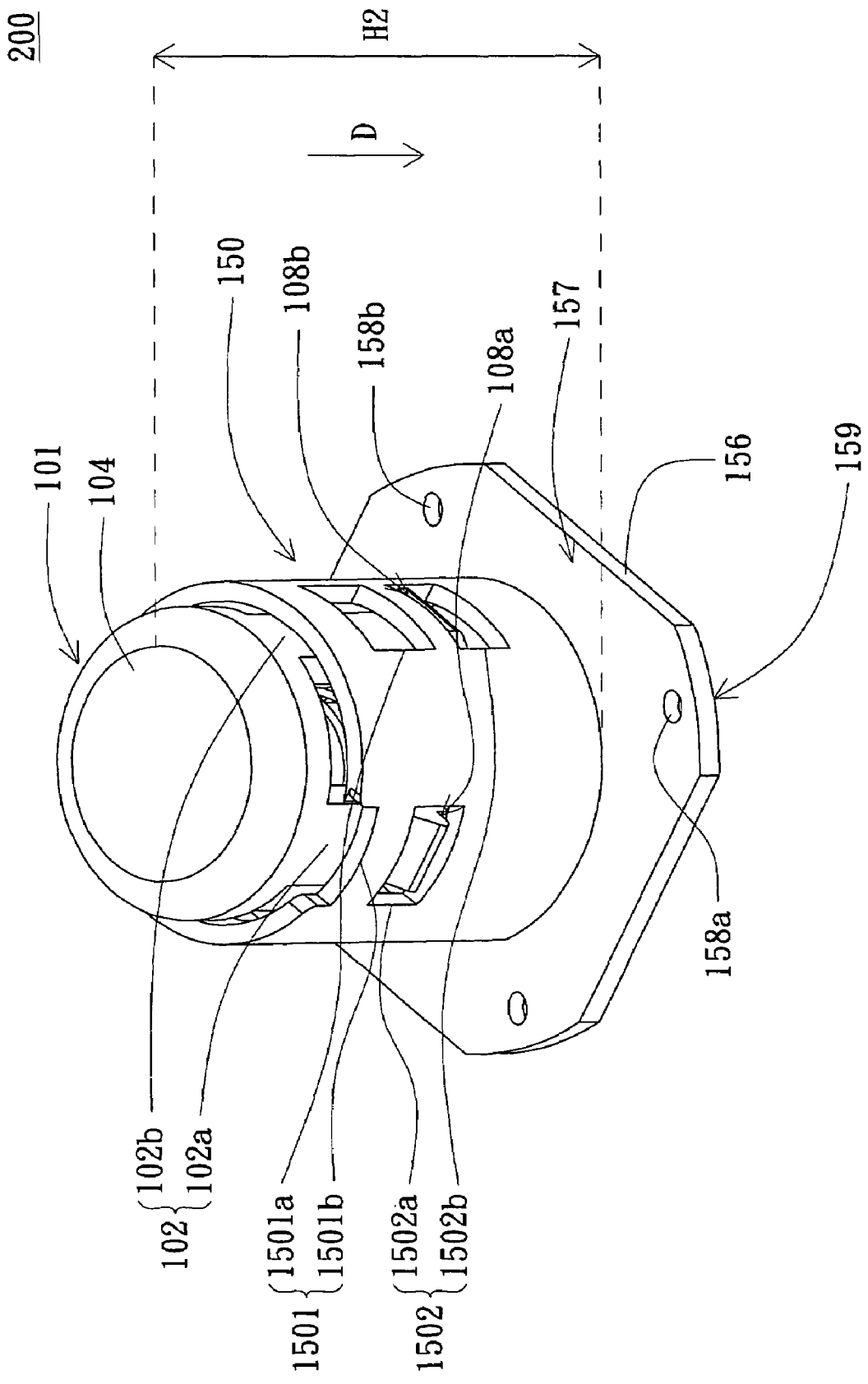
FIG. 2B is a perspective of a supporting structure with a second height according to the first embodiment of the invention.

Referring to FIG. 1, a perspective of a display device according to a first embodiment of the invention is shown. Referring to both FIG. 2A and FIG. 2B. FIG. 2A is a perspective of a supporting structure with a first height according to the first embodiment of the invention. FIG. 2B is a perspective of a supporting structure with a second height according to the first embodiment of the invention. In FIG. 1, the display device 100 includes a display panel 120, a casing 130 and a supporting structure 200. The supporting structure 200 used for supporting the display panel 120 is disposed on a bottom surface 132 of the casing 130.

Referring to FIG. 2A, the supporting structure 200 includes a sustaining component 150 and a fastening component 101. The sustaining component 150 at least includes two slot sets each including an upper slot and a lower slot. In the present embodiment of the invention, the sustaining component 150 includes a first slot set 1501 and a second slot set 1502. The first slot set 1501 includes a first upper slot 1501a and a first lower slot 1501b, wherein the first upper slot 1501a is slightly higher than the first lower slot 150b. The second slot set 1502 includes a second upper slot 1502a and a second lower slot 1502b, wherein the second upper slot 1502a is slightly higher than the second lower slot 1502b. In addition, the sustaining component 150 further includes a fixing part 156 connected to one end of the sustaining component 150, and the fixing part 156 has a top surface 157 and a bottom surface 159, wherein the top surface 157 of the fixing part 156 is connected to the sustaining component 150. Besides, the fixing part 156 includes at least two through slots 158a and 158b, which penetrate through the top surface 157 and the bottom surface 159 of the fixing part 156.

The fastening component 101 includes a hook set 102, a pressing part 104, a column 106 and an elastic element 107. A hook set 102 includes a first hook 102a and a second hook 102b. The second hook 102b is slightly longer than the first hook 102a, wherein the first hook 102a and the second hook 102b respectively have a first engaging surface 108a and a second engaging surface 108b. The pressing part 104 is connected to the hook set 102. The hook set 102 is extended along a direction D. The column 106 is connected to the pressing part 104 and extended along the same direction D. Examples of the elastic element 107 is a spring which is fitted over the column 106 at the action of which the column 106 can move up and down. Preferably, one end of the spring is connected to the column 106 and the other end is supported by the top surface 157 of the fixing part 156.

Referring to both FIG. 1 and FIGS. 2A~2B. The fastening component 101 is used for supporting the display panel 120. The sustaining component 150 is disposed on the bottom surface 132 of the casing 130. When the display panel 120 and the casing 130 are divided by a first height H1, the hook set 102 pass through the first slot set 1501, such that the supporting structure 200 has the first height H1. In other words, the first hook 102a of the hook set 102 passes through the first upper slot 1501a, and the second hook 102b of the hook set 102 passes through the first lower slot 1501b as indicated in FIG. 2A. Despite the present embodiment of the invention is exemplified by passing the hook set 102 through the first upper slot 1501, however, in practical application, the present embodiment of the invention can also be achieved by pressing the first slot set 1501 against the hook set 102 to support the hooks 102.

Meanwhile, the first engaging surface 108a of the first hook 102a is pressed against a lower edge of the first upper slot 1501a to provide the fastening component 101 with an upward force to support the display panel 120. As the elastic element 107 is compressed, the second engaging surface 108b of the second hook 102b is pressed against the upper edge of the first lower slot 1501b to provide the fastening component 101 with a downward force to match the force produced by the compressed elastic element 107. The upward force and downward force enable the supporting structure 200 to support the display panel 120 even firmly.

When the display panel 120 and the casing 130 are divided by a second height H2, the hook set 102 passes through the second slot set 1502, such that the supporting structure 200 has a second height H2 as indicated in FIG. 2B. Meanwhile, the first engaging surface 108a of the first hook 102a is pressed against the lower edge of the second upper slot 1502a to provide the fastening component 101 with an upward force to support the display panel 120. The second engaging surface 108b of the second hook 102b is pressed against the upper edge of the second lower slot 1502b to provide the fastening component 101 with a downward force to match the force of the elastic element 107. The upward force and the downward force enable the supporting structure 200 to support the display panel 120 even firmly.

As indicated in the above disclosure, the supporting structure 200 of the present embodiment of the invention is a height-adjustable supporting structure. The height-adjustable supporting structure, when disposed in a display device, is able to support various display panels with different measures of thickness. Consequently, there is no need to develop different sets of charge cores to correspond to the display panels with different measures of thickness, not only reducing the production cost but also increasing the production efficiency of the display device.

Figure 3:
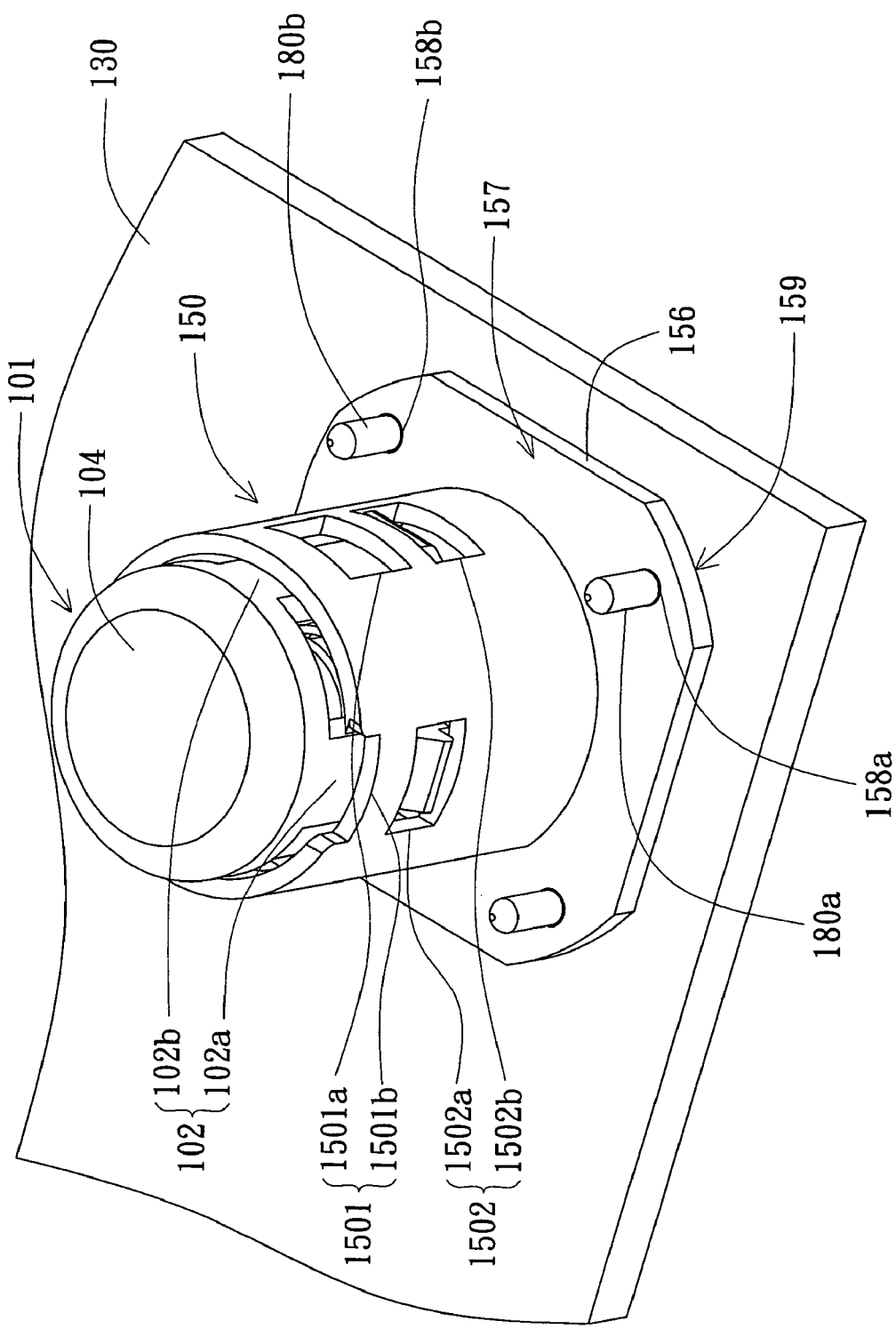
FIG. 3 is a perspective of a supporting structure being disposed on a casing according to the first embodiment of the invention.

Referring to FIG. 3, a perspective of a supporting structure being disposed on a casing according to the first embodiment of the invention is shown. In FIG. 3, the casing 130 comprises at least two connecting columns 180a and 180b. The two connecting columns 180a and 180b are respectively melted to pass through the two through slots 158a and 158b, such that the bottom surface 159 of the fixing part 156 is connected to the casing 130. The connecting columns 180a and 180b are preferably melted and infused into the through slots 158a and 158b. However, anyone who is skilled in the technology will understand that the way of connection exemplified here is not for limiting the scope of the technology of the invention.

To summarize, the supporting structure 200 of the present embodiment of the invention is a height-adjustable supporting structure, which, when disposed in a display device, is able to support various display panels with different measures of thickness. Consequently, there is no need to develop different sets of charge cores to correspond to the display panels with different measures of thickness, not only reducing the production cost but also increasing the production efficiency of the display device.

Second Embodiment

Figure 4:
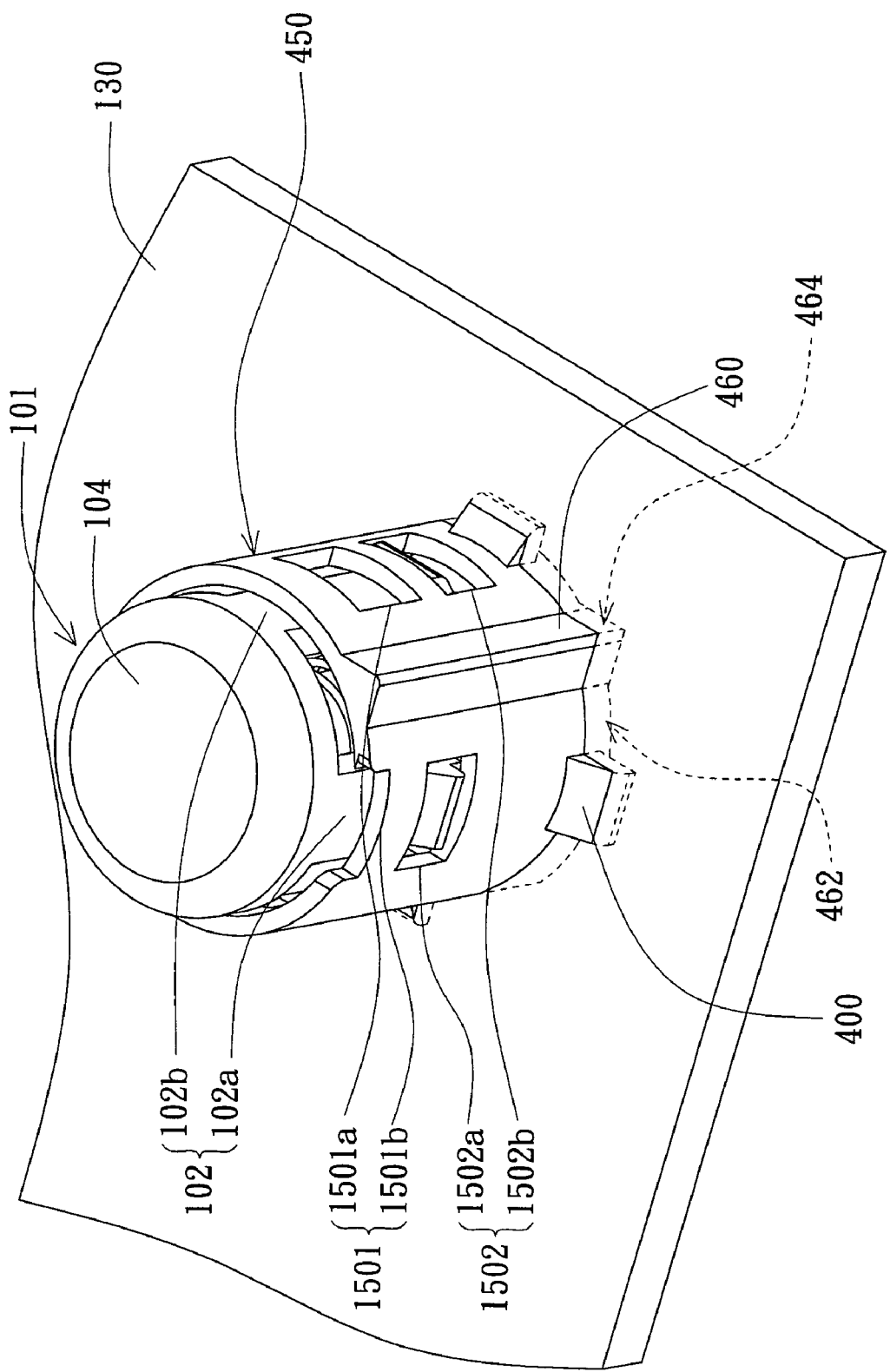
FIG. 4 is a perspective of a supporting structure being disposed on a casing according to a second embodiment of the invention.

Referring to FIG. 4, a perspective of a supporting structure being disposed on a casing according to a second embodiment of the invention is shown. The sustaining component 450 of the present embodiment of the invention differs with the sustaining component 150 of the first embodiment in the connecting mechanism between the sustaining component and the casing. As for other similar elements, the same reference numbers are used and are not repeated here. As indicated in FIG. 4, the sustaining component 450 further includes at least a positioning part 400 and an anti-slip bump 460. The positioning part 400 is disposed at the peripheral of the sustaining component 450, and the anti-slip bump 460 is disposed on one side of the sustaining component 450. The casing 130 includes an opening 462 and an anti-slip hole 464. When the sustaining component 450 is placed into the opening 462, the positioning part 400 is engaged with the opening 462. The anti-slip bump 460 is received in the anti-slip hole 464 for preventing the sustaining component 450 from rotating with respect to the casing 130.

There is an alternative connecting mechanism in addition to the connecting mechanism between the sustaining component and the casing as disclosed in the first embodiment and the present embodiment of the invention. The alternative mechanism is achieved by disposing a metal piece (not illustrated in the diagrams) between the casing 130 and the liquid crystal the display panel (as indicated in the display panel 120 of FIG. 1) and further disposing an opening and an anti-slip hole on the metal piece for receiving the sustaining component 450. In other words, the positioning part 400 of the sustaining component 450 is engaged with the opening disposed on the metal piece. Meanwhile, the anti-slip bump 460 is received in the anti-slip hole disposed on the metal piece for preventing the sustaining component 450 from rotating with respect to the metal piece.

According to the supporting structure and display device using the same disclosed in the above embodiments of the invention, the supporting structure is a height-adjustable supporting structure. The height-adjustable supporting structure, when disposed in a display device, is able to support various display panels with different measures of thickness. Consequently, there is no need to develop different sets of charge cores to correspond to the display panels with different measures of thickness, not only reducing the production cost but also increasing the production efficiency of the display device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A supporting structure applied in a display device comprising a casing and a display panel, the supporting structure comprising:

a fastening component used for supporting the display panel, wherein the fastening component comprises a hook set; and a sustaining component disposed on the casing, wherein the sustaining component comprises a plurality of slot sets which are spaced from the casing by different intervals;

wherein the hook set is movable with respect to the sustaining component so as to press against different slot sets, so that the display panel is spacable from the casing by different distances.

2. The supporting structure according to claim 1, wherein the sustaining component further comprises a fixing part connected to the end of the sustaining component.

3. The supporting structure according to claim 2, wherein the fixing part further comprises at least two through slots, and the casing comprises at least two connecting columns, which penetrate through the two through slots such that the bottom surface of the fixing part is connected to the casing.

4. The supporting structure according to claim 1, wherein the sustaining component further comprises an anti-slip bump, and the casing comprises an anti-slip hole for receiving the anti-slip bump to prevent the sustaining component from rotating with respect to the casing.

5. The supporting structure according to claim 4, wherein the sustaining component further comprises at least a positioning part disposed at the peripheral of the sustaining component, the casing comprises an opening, and the positioning part is engaged with the opening when the sustaining component is placed into the opening.

6. The supporting structure according to claim 1, wherein the sustaining component further comprises an anti-slip bump, the display device further comprises a metal piece disposed on the casing, and the metal piece comprises an anti-slip hole for receiving the anti-slip bump to prevent the sustaining component from rotating with respect to the metal piece.

7. The supporting structure according to claim 6, wherein the sustaining component further comprises at least a positioning part disposed at the peripheral of the sustaining component, the metal piece comprises an opening for receiving the sustaining component, and the positioning part is engaged with the opening when the sustaining component is placed into the opening.

8. The supporting structure according to claim 1, wherein the fastening component further comprises a pressing part, and the hook set is connected to the pressing part and extended along a direction.

9. The supporting structure according to claim 8, wherein the fastening component further comprises a column extended along the same direction with the hook set and connected to the pressing part.

10. The supporting structure according to claim 9, wherein the fastening component further comprises an elastic element connected to the column.

11. The supporting structure according to claim 1, wherein the hook set comprises a first hook and a second hook slightly longer than the first hook, and each of the slot sets comprises a lower slot and an upper slot higher than the lower slot.

12. The supporting structure according to claim 11, wherein the first hook comprises a first engaging surface, which is pressed against the lower edge of the upper slot of any of the slot sets.

13. The supporting structure according to claim 11, wherein the second hook comprises a second engaging surface, which is pressed against the upper edge of the lower slot of any of the slot sets.

14. A display device, comprising:
a display panel;
a casing; and
a supporting structure, comprising:
a fastening component used for supporting the display panel, wherein the fastening component comprises a hook set; and
a sustaining component disposed on the casing, wherein the sustaining component comprises a plurality of slot sets which are spaced from the casing by different intervals;
wherein the hook set is movable with respect to the sustaining component so as to press against different slot sets, so that the display panel is spacable from the casing by different distances.

15. The display device according to claim 14, wherein the sustaining component further comprises a fixing part connected to one end of the sustaining component.

16. The display device according to claim 15, wherein the fixing part further comprises at least two through slots, the casing comprises at least two connecting columns, which penetrate through the at least two through slots such that the bottom surface of the fixing part is connected to the casing.

17. The display device according to claim 14, wherein the sustaining component further comprises an anti-slip bump, the casing comprises an anti-slip hole for receiving the anti-slip bump to prevent the sustaining component from rotating with respect to the casing.

18. The display device according to claim 17, wherein the sustaining component further comprises at least a positioning part disposed at the peripheral of the sustaining component, the casing comprises an opening, and the positioning part is engaged with the opening when the sustaining component is placed into the opening.

19. The display device according to claim 14, wherein the sustaining component further comprises an anti-slip bump, the display device further comprises a metal piece disposed on the casing, and the metal piece comprises an anti-slip hole for receiving the anti-slip bump to prevent the sustaining component from rotating with respect to the metal piece.

20. The display device according to claim 19, wherein the sustaining component further comprises at least a positioning part disposed at the peripheral of the sustaining component, the metal piece comprises an opening for receiving the sustaining component, and the positioning part is engaged with the opening when the sustaining component is placed into the opening.

21. The display device according to claim 14, wherein the fastening component further comprises a pressing part, and the hook set is connected to the pressing part and extended along a direction.

22. The display device according to claim 21, wherein the fastening component further comprises a column extended along the same direction with the hook set and connected to the pressing part.

23. The display device according to claim 22, wherein the fastening component further comprises an elastic element connected to the column.

24. The display device according to claim 14, wherein the hook set further comprises a first hook and a second hook slightly longer than the first hook, and each of the slot sets comprises a lower slot and an upper slot higher than the lower slot.

25. The display device according to claim 24, wherein the first hook comprises a first engaging surface, which is pressed against the lower edge of the upper slot of any of the slot sets.

26. The display device according to claim 24, wherein the second hook comprises a second engaging surface, which is pressed against the upper edge of the lower slot of any of the slot sets.

* * * * *